(12) United States Patent
Yadav et al.

(10) Patent No.: US 9,844,112 B2
(45) Date of Patent: *Dec. 12, 2017

(54) CURRENT SPLITTER FOR LED LIGHTING SYSTEM

(71) Applicant: Hubbell Incorporated, Shelton, CT (US)

(72) Inventors: Pritam Yadav, Greenville, SC (US); T. Warren Weeks, Jr., Simpsonville, SC (US); David John Rector, Mauldin, SC (US); Martin C. Werr, Easley, SC (US); Anthony Michael Mackey, Downers Grove, IL (US); Bruce Robeson Rhodes, Inverness, IL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/386,838

(22) Filed: Dec. 21, 2016

(65) Prior Publication Data

US 2017/0105259 A1    Apr. 13, 2017

Related U.S. Application Data

(63) Continuation of application No. 14/937,468, filed on Nov. 10, 2015, now Pat. No. 9,723,683, which is a
(Continued)

(51) Int. Cl.
*H05B 33/08* (2006.01)
*H05B 37/02* (2006.01)

(52) U.S. Cl.
CPC ..... *H05B 33/0851* (2013.01); *H05B 33/0815* (2013.01); *H05B 33/0827* (2013.01);
(Continued)

(58) Field of Classification Search
None
See application file for complete search history.

(56) References Cited

U.S. PATENT DOCUMENTS 7,800,566 B2   9/2010   Ha et al.
7,902,771 B2   3/2011   Shteynberg et al.
(Continued)

OTHER PUBLICATIONS

PCT International Search Report for corresponding PCT Application No. PCT/US2015/060164, dated Jan. 29, 2016—3 pages.

*Primary Examiner* — Jany Richardson
(74) *Attorney, Agent, or Firm* — Dority & Manning, P.A.

(57) ABSTRACT

Systems and methods for controlling a light emitting diode (LED) system having a plurality of LED arrays are provided. The lighting system can include a dimmable LED driver circuit configured to provide a driver output suitable for providing a driver current to the LED arrays. A current splitter circuit can be provided between the LED driver circuit and the plurality of LED arrays to control the ratio of current from the driver output provided to each of the plurality of LED arrays. The current splitter circuit can be configured to control the current ratio provided to the plurality of LED arrays independently of the driver output according to a current ratio control curve based at least in part on a variable reference signal provided at the current splitter circuit.

20 Claims, 8 Drawing Sheets

Related U.S. Application Data continuation of application No. 14/667,203, filed on Mar. 24, 2015, now Pat. No. 9,538,604.

(60) Provisional application No. 62/085,980, filed on Dec. 1, 2014.

(52) U.S. Cl.
CPC ..... H05B 33/0869 (2013.01); H05B 37/0227 (2013.01); *H05B 33/0887* (2013.01)

(56) References Cited

U.S. PATENT DOCUMENTS

| | | |
|---|---|---|
| 8,203,276 B2 | 6/2012 | Shackle et al. |
| 8,552,662 B2 | 10/2013 | Sun et al. |
| 8,629,629 B2 | 1/2014 | Hariharan |
| 8,653,751 B2 | 2/2014 | Shimizu et al. |
| 2005/0007035 A1 | 1/2005 | Sloan et al. |
| 2006/0273331 A1 | 12/2006 | Lim et al. |
| 2011/0115407 A1 | 5/2011 | Wibben et al. |
| 2012/0326613 A1 | 12/2012 | Liu |
| 2013/0020951 A1 | 1/2013 | Pollock et al. |
| 2013/0063035 A1 | 3/2013 | Baddela et al. |
| 2013/0082615 A1 | 4/2013 | Williams et al. |
| 2014/0001972 A1* | 1/2014 | Harris ................ H05B 33/0842 315/200 R |
| 2014/0015420 A1 | 1/2014 | Liscinsky |
| 2014/0015425 A1 | 1/2014 | Kraft |
| 2014/0049189 A1 | 2/2014 | Ter Weeme et al. |
| 2014/0210357 A1 | 7/2014 | Yan et al. |
| 2014/0265902 A1 | 9/2014 | Yang et al. |
| 2014/0300289 A1 | 10/2014 | Zhu |
| 2014/0333216 A1* | 11/2014 | Zhang ................ H05B 33/0827 315/185 R |

* cited by examiner

CURRENT SPLITTER FOR LED LIGHTING SYSTEM

PRIORITY CLAIM

The present application is a continuation of U.S. application Ser. No. 14/937,468 having a filing date of Nov. 10, 2015, which is a continuation of U.S. application Ser. No. 14/667,203 having a filing date of Mar. 24, 2015, which claims the benefit of priority of U.S. Provisional Application No. 62/085,980, having a filing date of Dec. 1, 2014. Applicant claims priority to and benefit of all such applications and incorporate all such applications herein by reference.

FIELD

The present disclosure relates generally to light emitting diode (LED) lighting systems, and more particularly to a circuit for controlling multiple LED arrays.

BACKGROUND

LED lighting systems can include one or more LED devices that become illuminated as a result of the movement of electrons through a semiconductor material. LED devices are becoming increasingly used in many lighting applications and have been integrated into a variety of products, such as light fixtures, indicator lights, flashlights, and other products. LED lighting systems can provide increased efficiency, life and durability, can produce less heat, and can provide other advantages relative to traditional incandescent and fluorescent lighting systems. Moreover, the efficiency of LED lighting systems has increased such that higher power can be provided at lower cost to the consumer.

LED devices can be associated with various color temperatures and/or different monochromatic colors. The color temperature of an LED device provides a measure of the color of light emitted by the LED device. For instance, the color temperature can refer to the temperature of an ideal black body radiator that radiates light of comparable hue to the LED device. LED devices associated with higher color temperatures can provide a more bluish color while LED devices associated with lower color temperatures can provide a more reddish color. Certain LED lighting systems can include multiple LED arrays associated with different color temperatures. The light emitted by the different LED arrays can be controlled to provide a desired overall color output for the lighting system.

For instance, LED lighting systems can include one or more LED driver circuits that are used to convert input power from an AC power source to a suitable driver current for powering LED arrays having one or more LED devices. The color temperature of the LED lighting system can be adjusted by controlling the amount of light emitted by the LED arrays of differing color temperatures. In some systems, the color temperature of the LED lighting system is controlled based on the driver output of the driver circuit so that the color temperature of the lighting system approximates the behavior of an incandescent lighting system during, for instance, dimming of the lighting system.

SUMMARY

Aspects and advantages of embodiments of the present disclosure will be set forth in part in the following description, or may be learned from the description, or may be learned through practice of the embodiments.

One example aspect of the present disclosure is directed to a light emitting diode (LED) system. The system can include a first LED array, a second LED array, and a dimmable driver circuit configured to provide a driver output. The system can further include a current splitter circuit configured to receive the driver output and to provide a first current to the first LED array and a second current to the second LED array. The system can further include an interface at the current splitter circuit configured to receive a variable reference signal. The current splitter circuit can be configured to control a current ratio of the first current and the second current independently of the driver output according to a current ratio control curve. The current ratio control curve can specify the current ratio as a function of at least the variable reference signal.

Other example aspects of the present disclosure are directed to systems, methods, apparatus, circuits, and electronic devices for controlling a lighting system having a plurality of LED arrays.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
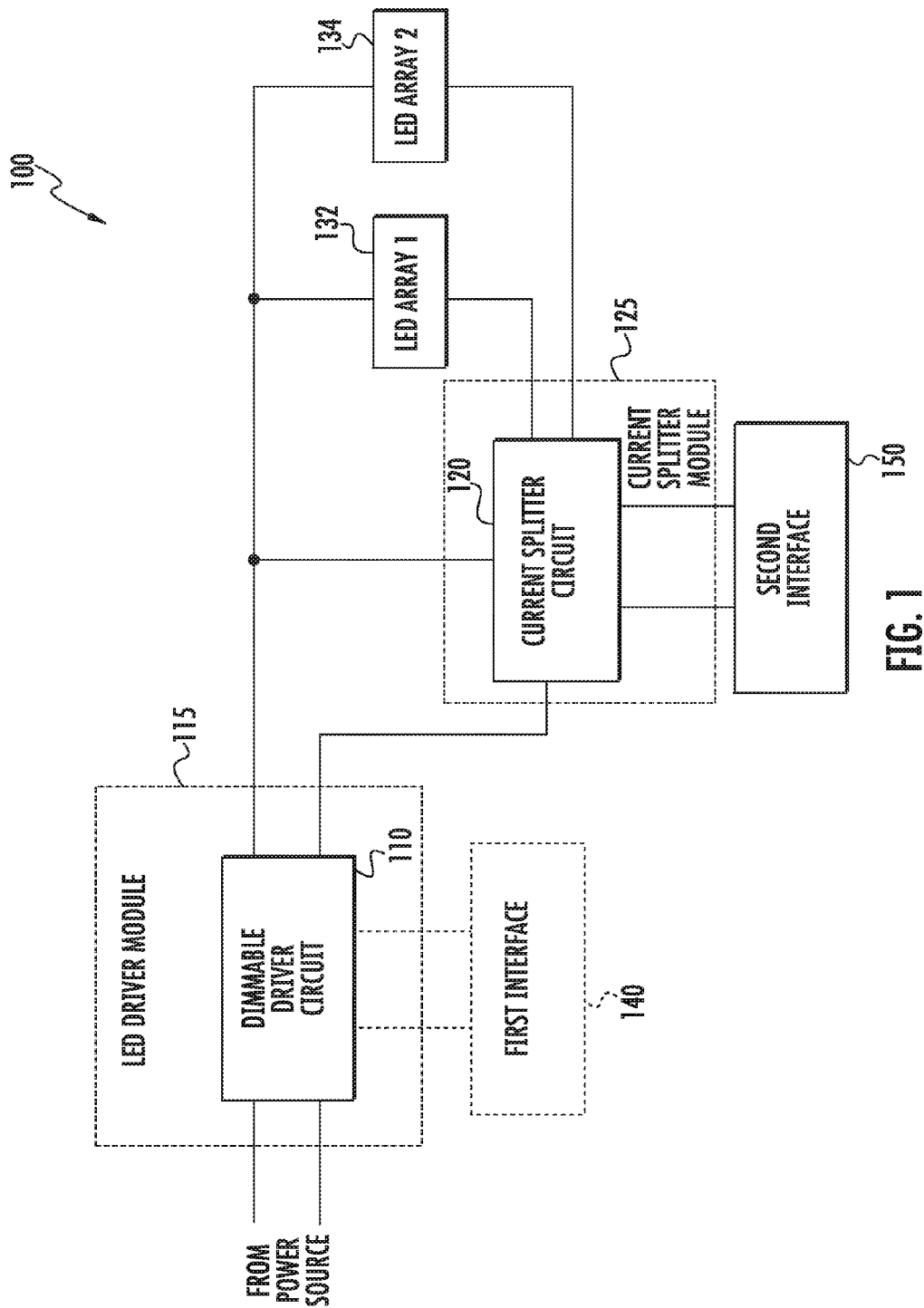
FIG. 1 depicts an example LED lighting system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment.

Thus, it is intended that aspects of the present disclosure cover such modifications and variations.

Example aspects of the present disclosure are directed to controlling a plurality of LED arrays in an LED lighting system. As used herein, a lighting system can include, but is not limited to, one or more of a lighting circuit, light engine, one or more luminaires, one or more lighting fixtures, one or more lighting units, a plurality of lighting devices arranged in an environment, a combination of any of the foregoing, or other lighting system. An LED lighting system can include a plurality of LED arrays. An LED array can include one or more LED devices. In certain embodiments, each LED array can be associated with a different color temperature, different brightness, different lighting direction or other characteristic. The lighting system can include a driver circuit configured to provide a driver output suitable for providing a driver current to the LED arrays. A current splitter circuit can be provided between the dimmable driver circuit and the plurality of LED arrays to control the ratio of current from the driver output provided to each of the plurality of LED arrays. The current ratio among the plurality LED arrays can be controlled to provide desired overall lighting effects for the LED system, such as to provide a desired color temperature, brightness, increased uplighting and/or downlighting, or other suitable effects.

According to example aspects of the present disclosure, the lighting system can include a dimmable driver circuit configured to provide a driver output. The driver output can be a suitable driver current for powering the plurality of LED arrays. The dimmable driver circuit can include one or more controls for adjusting the driver output of driver circuit. For instance, the dimmable driver circuit can be a line dimmable driver circuit (e.g. a phase-cut dimmable driver, a Triac dimmer, trailing edge dimmer, etc.). The line dimmable driver circuit can adjust the driver output by adjusting the power input to the driver circuit from an AC power source or other power source.

In addition and/or in the alternative, the dimmable driver circuit can include a dimming control interface. The dimming control interface can be configured to receive a dimming control signal used to facilitate dimming of the plurality of LED arrays. As the dimming control signal is adjusted, the driver output of the driver circuit can be modified to collectively reduce or increase the lumen output and/or radiant flux of the plurality of LED arrays. The dimming control signal can be, for instance, a 0V to 10V signal received from an external circuit, such as a dimmer circuit, smart interface control, potentiometer, Zener diode circuit, or other device. As used herein, a 0V to 10V lighting control signal can vary from, for instance, 1V to 9V, 1V to 10V, 2V to 8V, 2V to 9V, 2V, to 10V, 1V to 11V, or other suitable range between about 0V and about 10V. Other suitable protocols can be used for the dimming control signal. For instance, the lighting control signal can be a digital addressable lighting interface (DALI) lighting control signal, digital multiplex (DMX) lighting control signal, or other control signal.

The lighting system can further include an interface (e.g. one or more circuits, terminals, pins, contacts, conductors, etc.) at the current splitter circuit for receiving a variable reference signal used to control the current ratio among the plurality of LED arrays. Similar to the dimming control signal, the variable reference signal can be, for instance, a 0V to 10V signal provided from an external circuit such as a dimmer circuit, smart interface control, potentiometer, Zener diode circuit, or other device. The lighting control signal can be a DALI lighting control signal, DMX lighting control signal, or other control signal. Alternatively and/or in addition, the current splitter circuit can have its own internal variable reference for controlling the current ratio among the plurality of LED arrays.

The current splitter circuit can adjust the current ratio among the plurality of LED arrays based at least in part on the variable reference signal independently of the driver output. For instance, the dimmable driver circuit can be used to reduce or increase the driver output provided to the current splitter to control the overall lumen output of the plurality of LED arrays. The variable reference signal provided to the current splitter circuit can be used to independently adjust the current ratio among the plurality of LED arrays regardless of the driver output provided to the current splitter. The independent adjustment of the current ratio among the plurality of LED arrays can provide for the independent color temperature adjustment and/or adjustment of other lighting effects of the LED system.

For example, a lighting system can include a first LED array and a second LED array. The first LED array can be associated with a different color temperature relative to the second LED array. As the variable reference signal provided to the current splitter circuit is adjusted, for instance, from 0V to 10V, the current splitter circuit can adjust the ratio of the current provided to the first LED array relative to the current provided to the second LED array. As a result, the amount of light emitted by the first LED array at a first color temperature can be adjusted relative to the amount of light emitted by the second LED array at a second color temperature, resulting in a different overall color temperature of the light output of the lighting system.

As another example, a lighting system can include a first LED array associated with a first lighting direction (e.g. to provide uplighting) and a second LED array associated with a second lighting direction (e.g. to provide downlighting). As the variable reference signal provided to the current splitter circuit is adjusted, for instance, from 0V to 10V, the current splitter circuit can adjust the ratio of the current provided to the first LED array relative to the current provided to the second LED array. As a result, the amount of lighting in the first direction can be adjusted relative to the amount of lighting in the second direction to provide different lighting effects in the lighting system.

According to particular implementations, the current splitter circuit can include one or more control devices, such as one or more microcontrollers, microprocessors, logic devices, integrated circuits, or other control devices. The control device(s) can be powered at least in part by the driver output of the driver circuit and can receive as a control input the variable reference signal. The control device(s) can control switching elements (e.g. transistors) in communication with each of the plurality of LED arrays to respectively control the current supplied to each of the LED arrays.

The control device(s) can adjust the current ratio among the plurality of LED arrays based at least in part on a current ratio control curve programmed in firmware or other memory accessible by the control device. The current ratio control curve can specify a ratio of currents among the plurality of LED arrays as a function of at least the variable reference signal. The current ratio control curve can take any suitable format, such as a look table, matrix, or other data correlating current ratio with the variable reference signal.

The current ratio control curve can be easily defined in firmware or instructions in memory accessible by the control device(s) according to consumer needs to meet various optical output requirements. For instance, the current ratio control curve can be designed as linear, super-linear, parabolic, logarithmic, asymptotic, exponential, as a step function, or other relationship between the current ratio and the variable reference signal, depending on the desired performance of the lighting system. In this way, the current splitter circuit according to example aspects of the present disclosure can be easily adapted to a variety of different lighting applications.

With reference now to the Figures, example embodiments of the present disclosure will be discussed in detail. FIG. 1 depicts an example LED lighting system 100 according to example embodiments of the present disclosure. The LED lighting system 100 includes an LED driver module 115, a current splitter module 125, and a plurality of LED arrays, including a first LED array 132 and a second LED 134. While two LED arrays are illustrated in FIG. 1, those of ordinary skill in the art, using the disclosures provided herein, will understand that any number of LED arrays can be used in the lighting system 100 without deviating from the scope of the present disclosure.

Each of the first LED array 132 and the second LED array 134 can include one or more LED devices. The LED devices can emit light (e.g. visible light, ultraviolet light, infrared light, or other light or electromagnetic energy) as a result of electrons moving through a semiconductor material. In particular example implementations, the first LED array 132 can be associated with a different color temperature than the second LED array 134. For instance, the first LED array can include one or more LED devices that emit light at a different color than the second LED array.

The present disclosure is discussed with reference to LED arrays having different color temperature for purposes of illustration and discussion. The LED arrays can include many other suitable variations without deviating from the scope of the present disclosure. For instance, the LED arrays can be associated with a different brightness, different lighting direction, different layout, or other suitable characteristics. The LED arrays can be implemented on the same circuit board or on different circuit boards.

The LED driver module 115 can include a dimmable driver circuit 110. The current splitter module 125 can include a current splitter circuit 120. In the embodiment illustrated in FIG. 1, the LED driver module 115 can be disposed in a housing, circuit board, or other component of the lighting system 100 that is separate from and/or external to the current splitter module 125. For instance, the current splitter module 125 can be a module external to the LED driver module 115 that is disposed in an electrical path between the LED driver module 115 and the plurality of LED arrays.

The dimmable driver circuit 110 can be configured to receive an input power, such as an input AC power or an input DC power, and can convert the input power to a suitable driver output (e.g. driver current) for powering the plurality of LED arrays. In some embodiments, the dimmable driver circuit 110 can include various components, such as switching elements (e.g. transistors) that are controlled to provide a suitable driver output. For instance, in one embodiment, the driver circuit 110 can include one or more transistors. Gate timing commands can be provided to the one or more transistors to convert the input power to a suitable driver output using pulse width modulation techniques. In one example, the driver circuit 110 can convert the input power to a driver output that can range from about 0V to about 60V DC. As used herein, the use of the term "about" in conjunction with a numerical value is intended to refer to within 25% of the stated numerical value.

In some example embodiments, the dimmable driver circuit 110 can be a line dimming driver, such as a phase-cut dimmable driver, Triac dimmer, trailing edge dimmer, or other line dimming driver. The driver output can be adjusted using the line dimming driver by controlling the input power to the dimmable driver circuit.

In addition and/or in the alternative, a first interface 140 can be provided at the dimmable driver circuit 110 for receiving a dimming control signal used to control the driver output. The first interface 140 can include one or more components for communicating the dimming control signal to the driver circuit 110. For example, the first interface 140 can include one or more circuits, terminals, pins, contacts, conductors, or other components for communicating the dimming control signal to the driver circuit 110.

The dimming control signal can be provided from an external circuit, such as an external dimming circuit. The external circuit can include one or more devices, such as a smart dimming interface, a potentiometer, a Zener diode, or other device. In one example implementation, the dimming control signal can be a 0V to 10V dimming control signal, depending on the output of the external circuit. For instance, if a user manually adjusts a dimmer, the dimming control signal can be adjusted from, for instance, 0V to 5V. The dimming control signal can be implemented using other suitable protocols, such as a DALI protocol, or a DMX protocol.

The driver circuit 110 can be configured to adjust the driver output based at least in part on the dimming control signal. For example, reducing the dimming control signal by 50% can result in a corresponding reduction in the driver output of about 50%. The reduction of the driver output can reduce the overall driver current for supply to the plurality of LED arrays. As a result, the lumen output of the plurality of LED arrays can be simultaneously adjusted (e.g. dimmed) by varying the dimming control signal.

As illustrated in FIG. 1, the driver output can be provided to a current splitter circuit 120. The current splitter circuit 120 can be configured to split the driver output into a first current for powering the first LED array 132 and a second current for powering the second LED array 134. In this way, the current splitter circuit 120 can be used to adjust the lumen output of the first LED array 132 relative to the lumen output of the second LED array 134. The current splitter circuit 120 can be configured to control the current ratio of the first current provided to the first LED array 132 to the second current provided to the second LED array based on a variable reference signal (e.g. a 0V to 10V lighting control signal).

More particularly, the lighting system 100 can include a second interface 150 at the current splitter circuit 120 for receiving the variable reference signal. The second interface 150 can include one or more components for communicating the variable reference signal to the current splitter circuit 120. For example, the second interface 150 can include one or more circuits, terminals, pins, contacts, conductors, or other components for communicating a variable reference signal to the current splitter circuit 120.

The variable reference signal can be provided from an external circuit, such as an external dimming circuit. The external circuit can include one or more devices, such as a smart dimming interface, a potentiometer, a Zener diode, or other device. The variable reference signal can be a 0V to 10V lighting control signal, depending on the output of the external circuit. If a user manually adjusts a dimmer, the variable reference signal can be adjusted from, for instance, 0V to 5V. The variable reference signal can be implemented using other suitable protocols, such as a DALI protocol, or a DMX protocol.

In some example embodiments, the current splitter circuit 120 can include an internal circuit for providing an internal variable reference signal. The internal circuit can be configured to provide, for instance, a 0V to 10V variable reference signal based at least in part on signals received from a potentiometer, Zener diode, or other device directly coupled to the internal circuit.

The current splitter circuit 120 can include one or more control devices (e.g. a microprocessor, a microcontroller, logic device, etc.) and one or more switching elements (e.g. transistors) in line with each of the first LED array 132 and the second LED array 134. The control device(s) can control the amount of current provided to the first LED array 132 and the second LED array 134 by controlling the switching elements. The switching elements used to control the amount of current provided to the first LED array 132 and to the second LED array 134 can be either on the low voltage side of the LED arrays or the high voltage side of the LED arrays.

In particular aspects, the control device(s) can control the current provided to the first LED array 132 and to the second LED array 134 according to a current ratio control curve based on the variable reference signal. The current ratio control curve can be stored in firmware or stored in a memory accessible by the control device. The current ratio control curve can specify the current ratio of the first current provided to the first LED array 132 and the second current provided to the second LED array 134 as a function of at least the variable reference signal.

The current ratio control curve can be provided in any suitable format. For instance, the current ratio control curve can be provided as a look up table, matrix, correlation, or other data specifying the current ratio as a function of at least the variable reference signal. The current ratio control curve can be defined based on any desired relationship between the current ratio and the variable reference signal. For instance, the current ratio control curve can be designed as linear, super-linear, parabolic, logarithmic, asymptotic, exponential, as a step function, or other relationship between the current ratio and the variable reference signal, depending on the desired performance of the lighting system.

Figure 2:
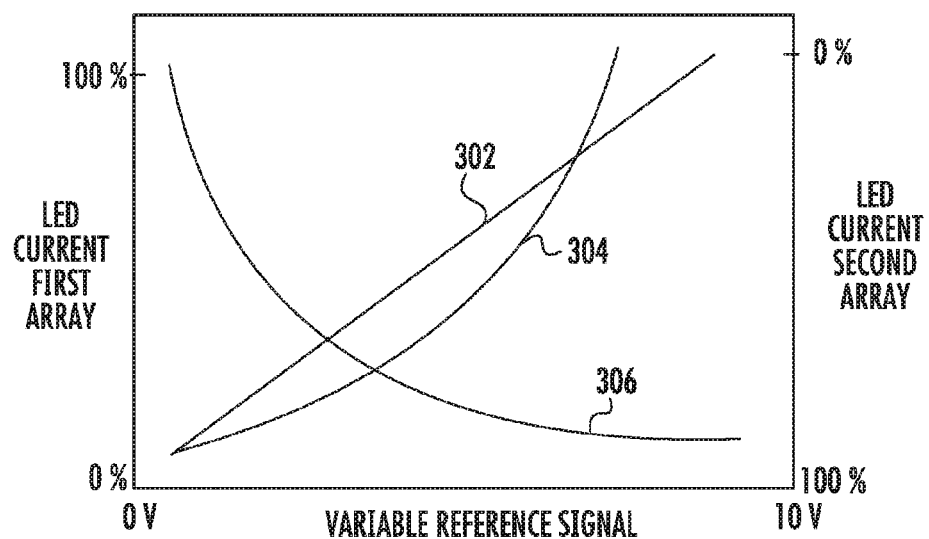
FIGS. 2-3 depict example control curves according to example embodiments of the present disclosure.
Figure 3:
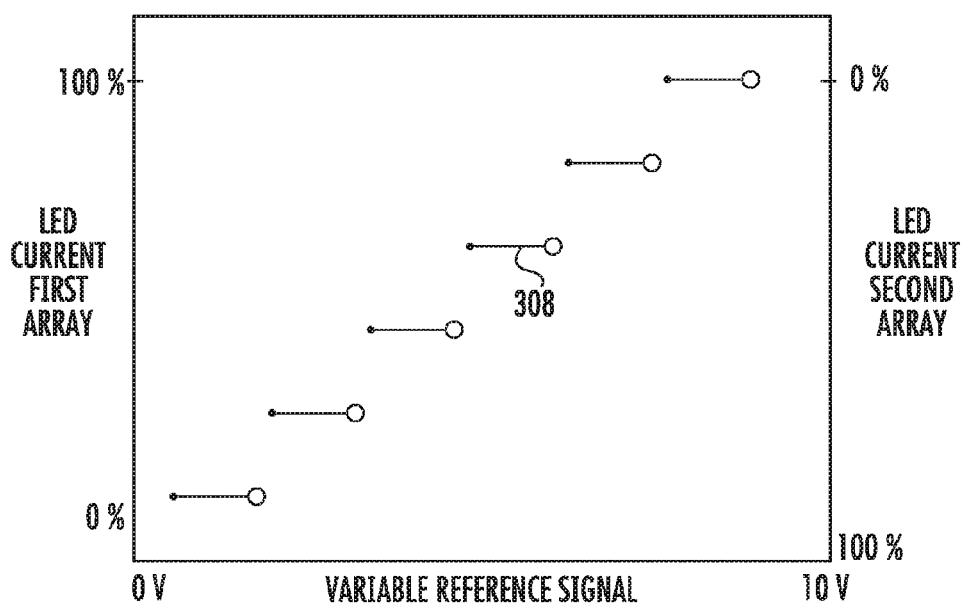

FIGS. 2 and 3 depict example current ratio control curves according to example aspects of the present disclosure. FIGS. 2 and 3 plot a magnitude of the variable reference signal along the horizontal axis, a percentage of maximum current that can be provided to the first LED array along the left vertical axis, and a percentage of maximum current that can be provided to the second LED array along the right vertical axis.

FIG. 2 depicts three example current ratio control curves 302, 304, and 306. Curve 302 depicts a current ratio control curve based on a generally linear relationship. A current splitter circuit controlling the current ratio according to curve 302 can linearly increase the current supplied to the first LED array while linearly decreasing the current supplied to the second LED array as the variable reference signal is increased from about 0V to about 10V.

Curve 304 depicts an example control curve defined based on an exponential relationship. A current splitter circuit controlling the current ratio according to curve 304 can exponentially increase the current provided to the first LED array while exponentially decreasing the current provided to the second LED array as the variable reference signal is increased from about 0V to about 10V.

Curve 306 depicts an example control curve defined based on an inverse exponential relationship. A current splitter circuit controlling the current ratio according to curve 306 can decrease the current provided to the first LED array while increasing the current provided to the second LED array as the variable reference signal is increased from about 0V to about 10V.

FIG. 3 depicts a current ratio control curve 308 defined based on a step function. A current splitter circuit controlling the current ratio according to curve 308 can increase the current provided to the first LED array in stepped incremental fashion while decreasing the current provided to the second LED array in stepped incremental fashion as the variable reference signal is increased from about 0V to about 10V.

As demonstrated, a variety of possible current ratio control curves can be defined for the current splitter circuit 120 of FIG. 1 depending on the desired performance of the lighting system 100. This can be particularly useful in circumstances where constant light levels are desired between LED arrays associated with different color temperatures where one of the LED arrays operates at a different efficiency than the other LED arrays.

In embodiments where the first LED array 132 is associated with a different color temperature than the second LED array 134, the adjustment of the current ratio based on the variable reference signal can provide for the independent adjustment of the color temperature and/or other lighting effects of the lighting system 100. For instance, the dimmable driver circuit 110 can be controlled (e.g. using a dimming control signal) to simultaneously control the lumen output or dimming of both the first LED array 132 and the second LED array 134. The variable reference signal can be used to independently control the current ratio between the first current and the second current to adjust the color temperature and/or other lighting effects of the overall light output by lighting system 100, irrespective of the driver output provided by the dimmable driver circuit 110.

Figure 4:
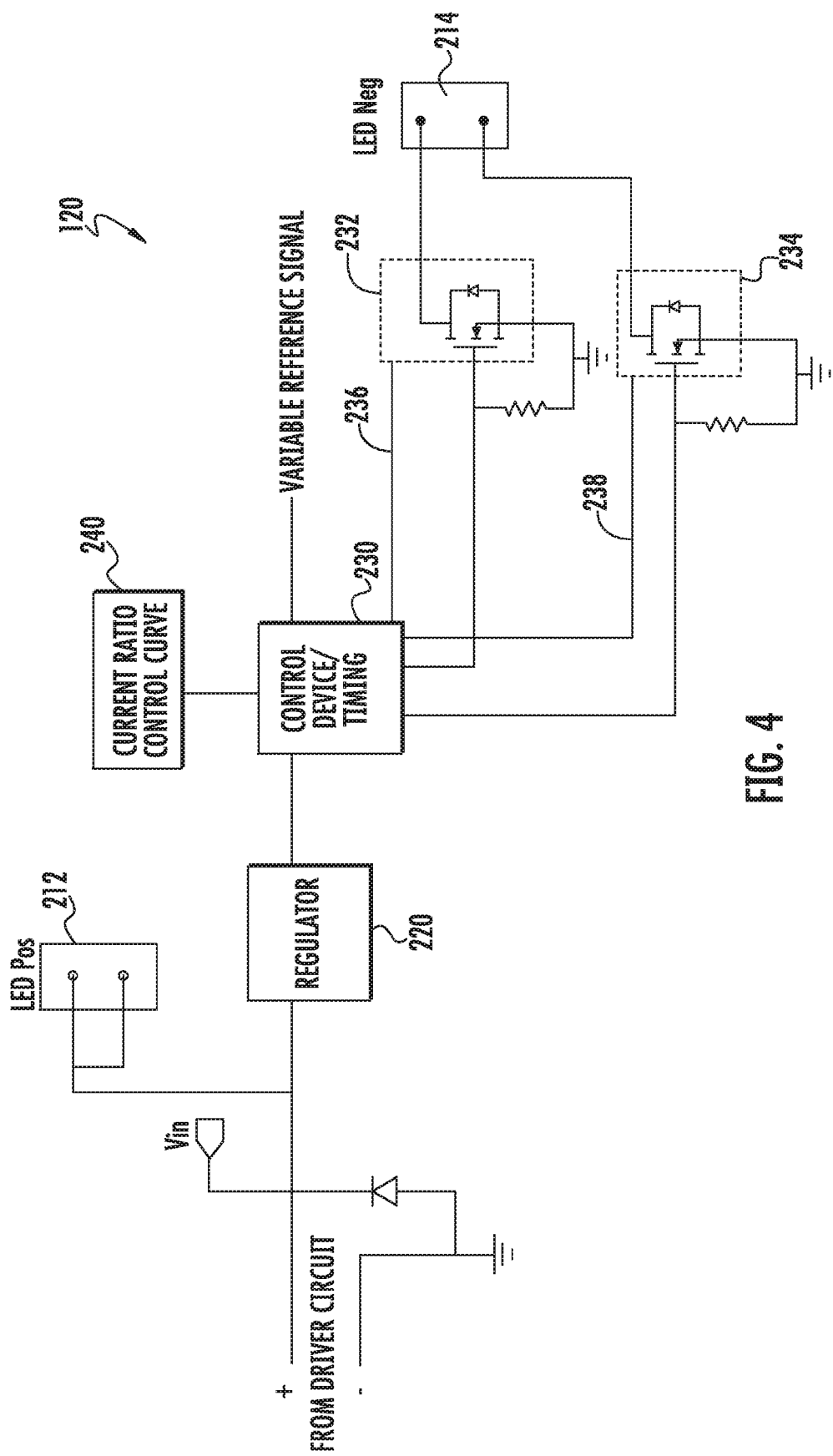
FIG. 4 depicts a schematic of an example current splitter circuit according to example embodiments of the present disclosure.

FIG. 4 depicts a schematic of an example current splitter circuit 120 according to example embodiments of the present disclosure. The current splitter circuit 120 receives the driver output from a driver circuit and couples the high voltage side of the driver output to the positive terminals 212 of the LED arrays. The high voltage side of the driver output is provided to a regulator 220 (e.g. voltage regulator) which regulates the driver output to an output level suitable for a control device 230. The high voltage side of the driver output can also be used as Vin to power various components of the current splitter circuit 120.

The control device(s) 230 can include one or more suitable devices, such as one or more microcontrollers, microprocessors, logic devices, integrated circuits, or other control devices. In particular implementations, the control device(s) 230 can include timing circuits configured to provide for programmable clock output and time stamp output. The programmable clock output can be provided to control the plurality of LED arrays based on the clock output over a time period. For instance, the current splitter 120 can be configured to automatically adjust a current ratio among a plurality of LED arrays at different times throughout a day, month, or year to provide different lighting effects based on the output of the timing circuits.

The control device(s) 230 can be coupled the negative terminals 214 of the LED arrays through various switching elements. For instance, the control device 230 can be coupled to the negative terminal of the first LED array via a first switching element 232. The control device 230 can be coupled to the negative terminal of the second LED array via a second switching element 234.

The switching elements 232 and 234 illustrated in FIG. 4 are MOSFET devices. However, those of ordinary skill in the art, using the disclosures provided herein, will understand that other switching elements (e.g. other types of transistors) can be used without deviating from the scope of the present disclosure. The control device(s) 230 can control the switching elements 232 and 234 by providing gate signals to the switching elements 232 and 234.

Figure 5:
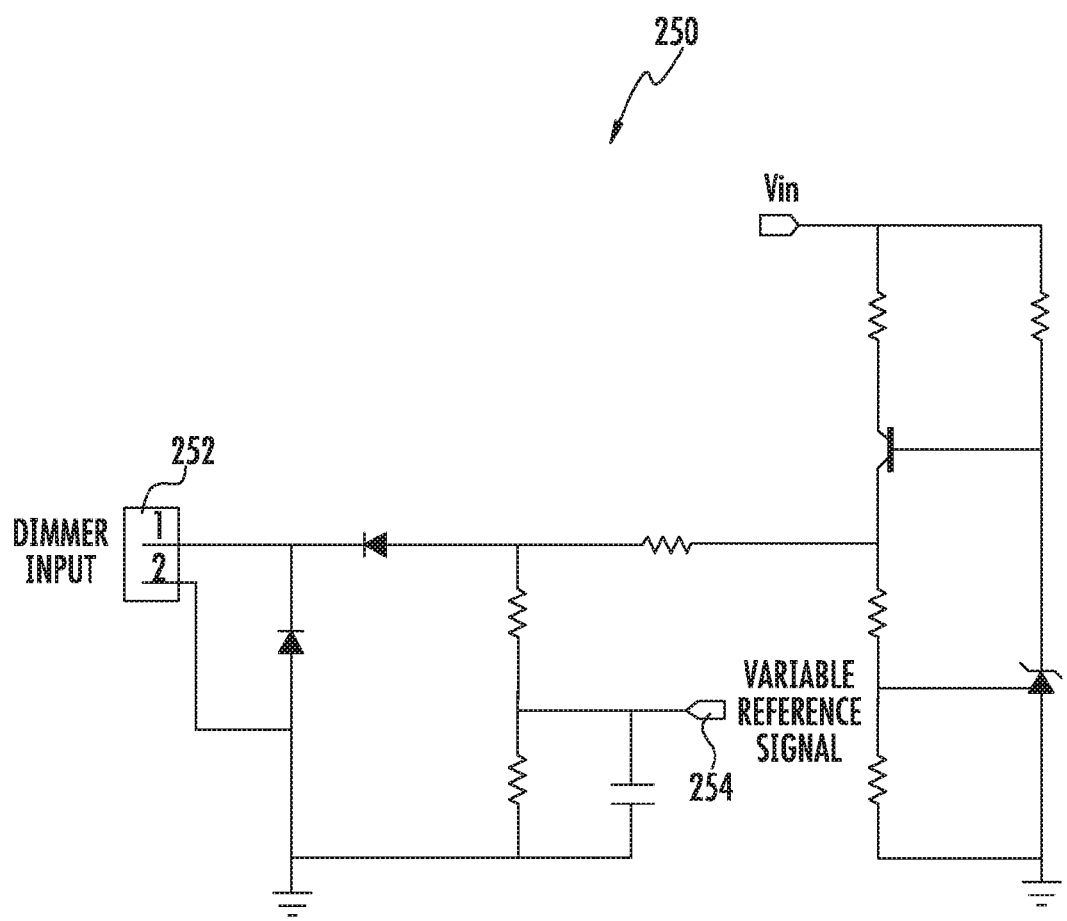
FIG. 5 depicts a schematic of an example circuit for providing a variable reference signal to a current splitter circuit according to example aspects of the present disclosure.

According to particular aspects of the present disclosure, the control device(s) 230 can control the switching elements 232 and 234 based on the variable reference signal from a second interface at the current splitter circuit 120. FIG. 5 depicts an example circuit 250 for providing the variable reference signal to the current splitter circuit 120. The circuit 250 can be internal or external to the current splitter circuit 120. For instance, the circuit 250 can be powered at least in part by Vin provided from the current splitter circuit 120.

The circuit 250 can be coupled to a dimmer input 252 configured to receive variable signal from a dimmer circuit, smart dimmer interface, potentiometer, Zener diode circuit, or other circuit. The circuit 250 can provide a 0V to 10V variable reference signal at 254 based at least in part on the signals received at the dimmer input 252. For example, the circuit 250 can provide the variable reference signal to the current splitter circuit 120 based at least in part on the signal received at the dimmer input 252.

Referring back to FIG. 4, the control device(s) 230 can control the switching elements 232 and 234 based on the variable reference signal according to a current ratio control curve 240 to provide a first current to the first LED array and a second current to the second LED array. The current ratio control curve 240 can be defined in firmware or as other instructions stored in a memory accessible by the control device(s) 230. The switching elements 232 and 234 can be controlled at an operating frequency that is selected to reduce the presence of flicker in the LED arrays as well as to reduce switching losses. For instance, in particular implementations, the switching elements 232 and 234 can be operated at a frequency in the range of about 100 Hz to 1 kHz.

According to particular aspects of the present disclosure, the switching elements 232 and 234 can include inbuilt current sensing options (e.g. current sensing power MOSFETs) for purposes of overcurrent protection. More particularly, the switching element 232 can be configured to provide a feedback signal via path 236 to control device 230 indicative of a current flowing in switching element 232. Switching element 234 can be configured to provide a feedback signal via path 238 to control device 230 indicative of a current flowing in switching element 234. The feedback signals can be used by the control device(s) 230 to provide overcurrent protection for the lighting system. For instance, the control device(s) 230 can discontinue or modify operation of the switching elements 232, 234 if the feedback signals from the switching elements 232, 234 are indicative of excessive current flowing through the switching elements 232, 234.

Figure 6:
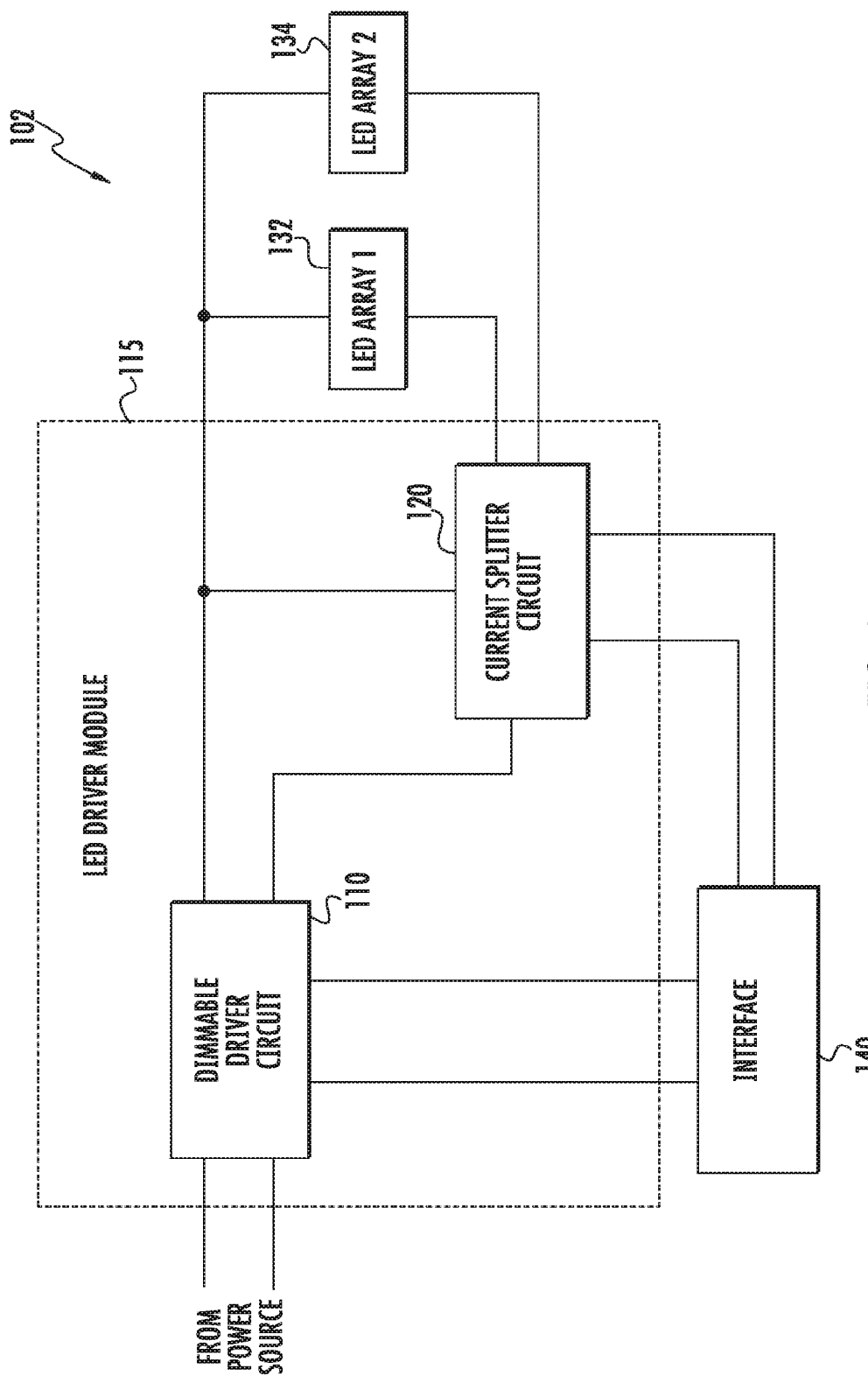
FIG. 6 depicts an example LED lighting system according to example embodiments of the present disclosure
Figure 7:
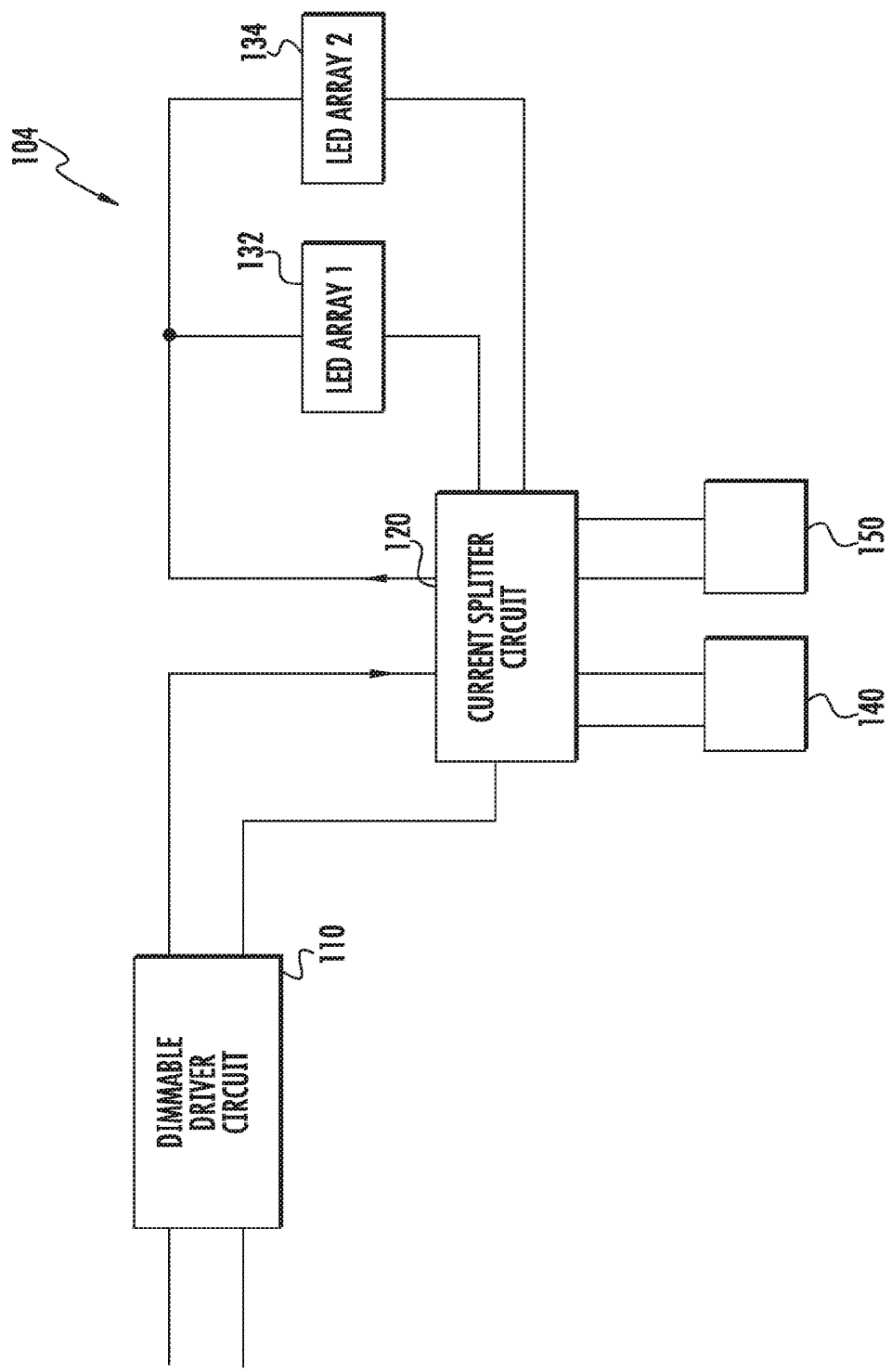
FIG. 7 depicts an example LED lighting system according to example embodiments of the present disclosure.
Figure 8:
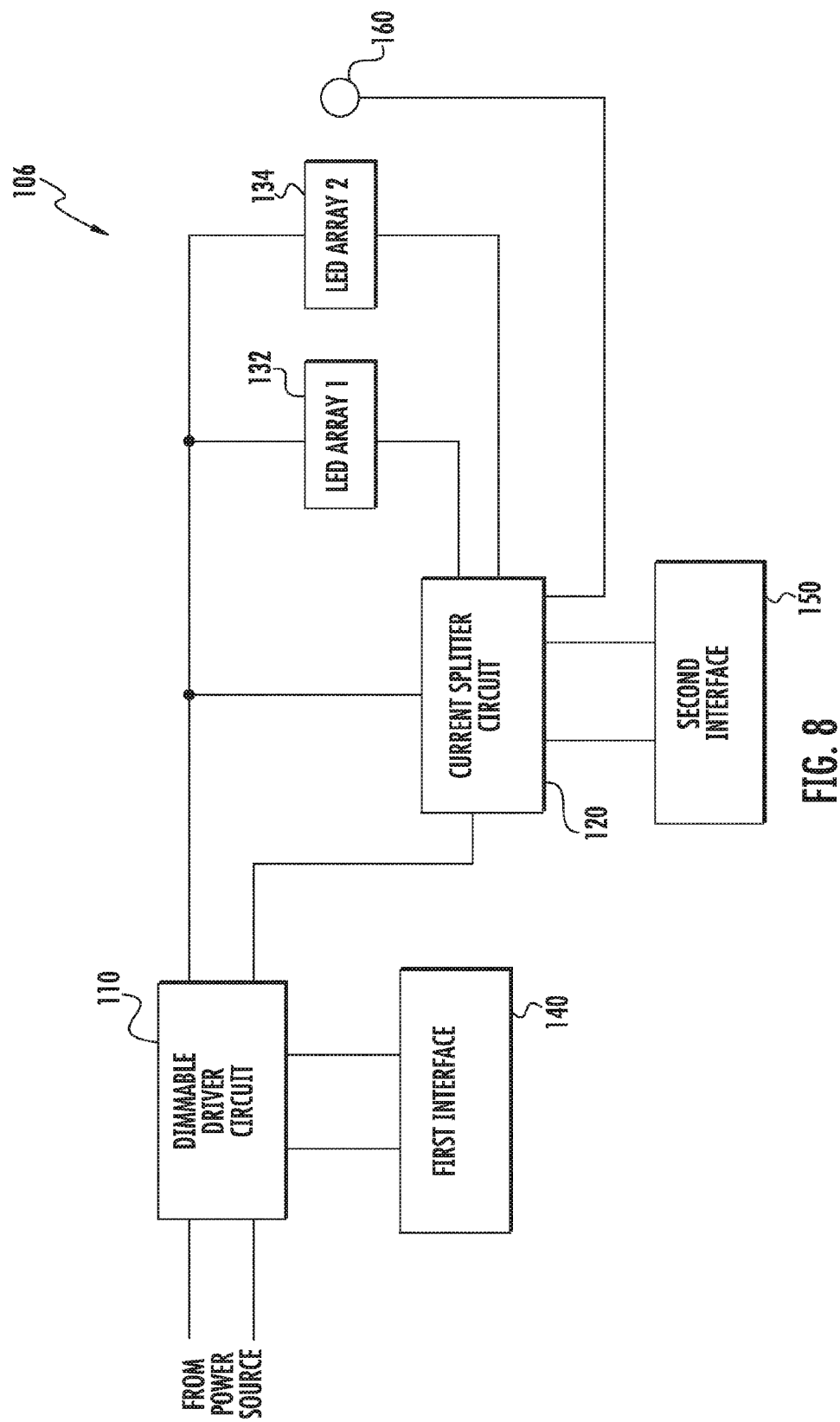
FIG. 8 depicts an example LED lighting system according to example embodiments of the present disclosure.

FIGS. 6-8 depict additional example embodiments of lighting systems according to example embodiments of the present disclosure. FIG. 6 depicts a lighting system 102 that includes many similar elements to the lighting system 100 of FIG. 1. For instance, the lighting system 102 includes a dimmable driver circuit 110, current splitter circuit 120, first interface 140, second interface, first LED array 132 and second LED array 134.

In the example embodiment of FIG. 6, the driver circuit 110 and the current splitter circuit 120 are both implemented as part of the LED driver module 115. For instance, driver circuit 110 and current splitter circuit 120 can be implemented on the same circuit board, in the same housing, and/or using one or more common components. In this way, the current splitter circuit 120 can be implemented within an LED driver module without requiring an external module disposed between an LED driver and the LED arrays.

The driver circuit 110 and the current splitter circuit 120 can receive a variable reference signal from an interface 140. The interface 140 can provide a variable reference signal to the driver circuit 110 to control the driver output of the driver circuit 110 and can provide a variable reference signal to the current splitter circuit 120 to control the current ratio among the plurality of LED arrays. The interface 140 can include one or more components for communicating the variable reference signal to the driver circuit 110 and to the current splitter circuit 120. For example, the interface 140 can include one or more circuits, terminals, pins, contacts, conductors, or other components for communicating a variable reference signal to the driver circuit and to the current splitter circuit 120.

The variable reference signal can be provided from an external circuit, such as an external dimming circuit. The external circuit can include one or more devices, such as a smart dimming interface, a potentiometer, a Zener diode, or other device. The interface 140 can include various circuits and/or control devices for selectively providing and adjusting the variable reference signal to both the driver circuit 110 and the current splitter circuit 120 to control dimming and/or other lighting effects of the lighting system 100.

For instance, in one embodiment, a switch (e.g. a three-way switch), toggle, touch control, or the like can be implemented as part of the interface 140 to select whether to adjust the variable reference signal to the driver circuit 110 and/or to the current splitter circuit 120. In another embodiment, a microcontroller or other control device can be used to recognize various user inputs at the interface 140. The user inputs can be interpreted to selectively adjust the variable reference signal to the driver circuit 110 and/or the current splitter circuit 120. For instance, the interface 140 can recognize that a user has quickly provided a dimming input (e.g. manually adjusted a dimmer coupled to the interface 140) twice within a time period. The first dimming input can be used to adjust the variable reference signal to the driver circuit 110 and the second dimming input can be used to adjust the variable reference signal to the current splitter circuit 120.

In yet another embodiment, an input device such as a 4-way joystick dimmer can be used to selectively control adjustment of the variable reference signal to the driver circuit 110 and/or the current splitter circuit 120. For instance, horizontal motion of the 4-way joystick can be used to adjust the variable reference signal provided to the driver circuit 110. Vertical motion of the 4-way joystick can be used to adjust the variable reference signal provided to the current splitter circuit 120. Diagonal motion of the 4-way joystick can be used to adjust the variable reference signal to both the driver circuit 110 and the current splitter circuit 120.

Various other inputs and/or control devices for selectively controlling and adjusting the variable reference input to the driver circuit 110 and the current splitter circuit 120 can be used without deviating from the scope of the present disclosure. For instance, a first interface can be used to provide a first variable reference signal to the driver circuit 110 and a second interface can be used to provide a second variable reference signal to the current splitter circuit 120.

FIG. 7 depicts a lighting system 104 according to another example embodiment of the present disclosure. The lighting system 104 includes a driver circuit 110, a current splitter circuit 120 and a plurality of LED arrays, including first LED array 132 and a second LED array 134. In the example embodiment of FIG. 7, both the dimming control interface 140 and the interface 150 for receiving the variable reference signal are provided at the current splitter circuit 120. As a result, the current splitter circuit 120 can provide a dual control interface that allows for dual control of both overall lumen output and color temperature or other lighting effects at the current splitter circuit.

More particularly, the dual control interface can receive a dimming control signal and a variable reference signal at the current splitter circuit 120. The dimming control signal and the variable reference signal can be received from two separate or dual external circuits, such as dimmer circuits, smart interface controls, potentiometers, Zener diode circuits, or other device. The dimming control signal can be used to control the driver output. The variable reference signal can be used to control the current ratio between the first LED array 132 and the second LED array 134 to provide different lighting effects.

FIG. 8 depicts a lighting system 106 according to another example embodiment of the present disclosure. FIG. 8 is similar to the lighting system 100 of FIG. 1, except that the lighting system 106 of FIG. 8 additionally includes an optical sensor 160 in communication with the current splitter circuit 120. The optical sensor 160 can be an ambient color sensor, light sensor, or other device configured to monitor lumen output and/or color of the light emitted by the LED arrays 132 and 134 and/or the lighting system 106. The optical sensor can provide a feedback signal to the current splitter circuit 120. The feedback signal can be indicative of the light output of the lighting system 106.

The current splitter circuit 120 can be configured to control the current ratio based at least in part on the feedback signal. For instance, if the light output of the lighting system 106 varies from a desired light output as determined by, for instance, a current ratio control curve or other control routine, the current splitter circuit 120 can make adjustments to the current ratio to achieve the desired light output.

Figure 9:
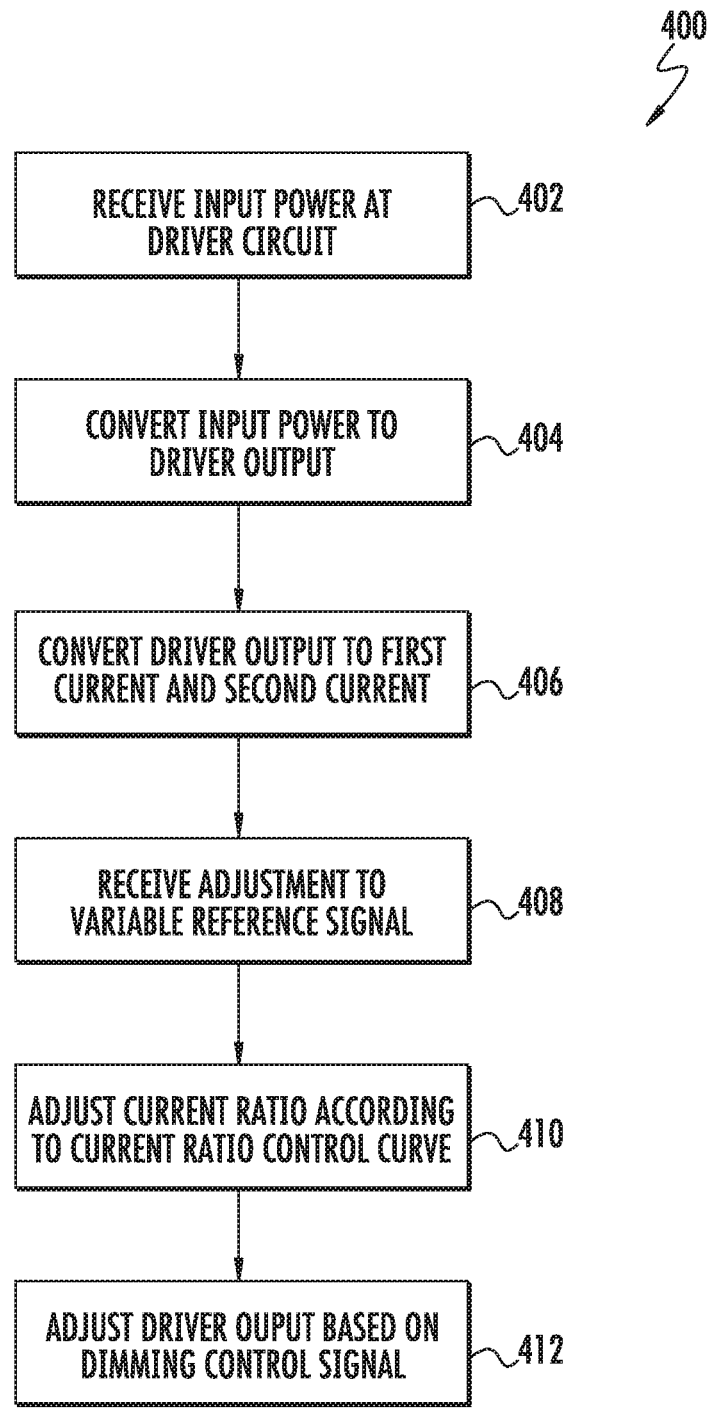
FIG. 9 depicts a flow diagram of an example method according to example embodiments of the present disclosure.

FIG. 9 depicts a flow diagram of an example method (400) for controlling a plurality of LED arrays according to example embodiments of the present disclosure. The method (400) will be discussed with reference to the lighting system 100 of FIG. 1 but can be implemented with other suitable lighting systems. In addition, FIG. 9 depicts steps performed in a particular order for purposes of illustration and discussion. Those of ordinary skill in the art, using the disclosures provided herein, will understand that the steps of any of the methods disclosed herein can be modified, adapted, expanded, omitted, and/or rearranged in various ways without deviating from the scope of the present disclosure.

At (402), the method includes receiving an input power at a driver circuit. For instance, the driver circuit 110 can receive an AC or DC input power from a power source. At (404), the method includes converting the input power to a driver output. For instance, the driver circuit 110 can convert the input power into a suitable driver output (e.g. a 0V to 60V DC output). The driver output can be determined based on the input power and/or based on dimming control signal.

At (406), the driver output is converted into a first current for a first LED array and a second current for a second LED array. For example, the current splitter circuit 120 can convert the driver output to a first current for the first LED array 132 and a second current for the second LED array 134.

According to example aspects of the present disclosure, a current ratio between the first current and the second current can be determined based at least in part on a variable reference signal received at the current splitter circuit. The variable reference signal can be received via interface 150 provided at the current splitter circuit 120. The variable reference signal can be, for instance, a 0V to 10V lighting control signal or other suitable lighting control signal received from an external circuit, such as a dimmer circuit, smart interface control, potentiometer, Zener diode circuit, or other external circuit or device.

At (408), the method can include receiving an adjustment to the variable reference signal. For instance, the variable reference signal can be adjusted from 10V to 5V as a result of a user manually adjusting a dimmer circuit providing the variable reference signal. In response to the adjustment of the variable reference signal, the method can include adjusting the current ratio between the first current and the second current (410). The current ratio between the first current and the second current can be adjusted according to a current ratio control curve. The current ratio control curve can specify the current ratio between the first current and the second current as a function of at least the variable reference signal.

In this way, the light output of the lighting system can be controlled using both a dimmable driver circuit and a variable reference signal. The dimmable driver circuit can be used to control the driver output to facilitate increasing or reducing the overall lumen output of the lighting system. For instance, the method can include adjusting the driver output based at least in part on a dimming control signal (412) to facilitate dimming of the first LED array and the second LED array. The variable reference signal can be used to control the current ratio between individual LED arrays in the lighting system, for instance, to facilitate control of the color temperature of the overall light output of the lighting system and/or to provide other lighting effects.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A current splitter circuit for a light emitting diode (LED) system, comprising:
    an input configured to receive a driver current;
    one or more outputs configured to provide a first current for a first LED array and a second current for a second LED array according to a current ratio;
    an interface configured to receive a variable reference signal for controlling the current ratio independently of the driver current;
    wherein the current splitter circuit is configured to adjust the current ratio of the first current and the second current according to a current ratio control curve, the current ratio control curve specifying the current ratio between the first current and the second current as a function of at least the variable reference signal.

2. The current splitter circuit of claim 1, wherein the current ratio control curve comprises a linear, super-linear, parabolic, logarithmic, asymptotic, or exponential relationship between the current ratio and the variable reference signal.

3. The current splitter circuit of claim 1, wherein the current ratio control curve comprises a step function defined at least in part on the variable reference signal.

4. The current splitter circuit of claim 1, wherein the current splitter circuit comprises:
  a first switching element;
  a second switching element; and
  one or more control devices configured to control the first switching element to provide the first current to the first LED array and to control the second switching element to provide the second current to the second LED array.

5. The current splitter circuit of claim 1, wherein the first switching element and the second switching element each comprise a current sensing MOSFET.

6. The current splitter circuit of claim 1, wherein the interface is configured to receive the variable reference signal from an external dimmer circuit.

7. The current splitter circuit of claim 1, wherein the variable reference signal is a 0V to 10V lighting control signal, a DALI lighting control signal, or a DMX lighting control signal.

8. The current splitter circuit of claim 1, further comprising an optical sensor coupled to the current splitter circuit, the optical sensor configured to provide a feedback signal indicative of a light output of the first LED array and the second LED array to the current splitter circuit, the current splitter circuit configured to control the current ratio based at least in part on the feedback signal.

9. The current splitter circuit of claim 1, wherein the first LED array is associated with a different color temperature than the second LED array such that adjustment of the variable reference signal facilitates adjustment of the color temperature of the LED system.

10. The current splitter circuit of claim 1, wherein the current splitter circuit comprises a timing circuit, the timing circuit configured to provide a clock output, the current splitter circuit configured to adjust the current ratio of the first current and the second current based at least in part on the clock output to provide different lighting outputs at different times.

11. A method for controlling a light emitting diode (LED) system, the method comprising:
  receiving an input power at a dimmable LED driver circuit;
  converting, by the dimmable LED driver circuit, the input power to a driver current;
  splitting, with a current splitter circuit, the driver current into a first current for a first LED array and a second current for a second LED array according to a current ratio;
  receiving, at the current splitter circuit, a clock output from a timing circuit; and
  adjusting, by the current splitter circuit, a current ratio between the first current and the second current based at least in part on the clock output.

12. The method of claim 11, wherein the first LED array is associated with a different color temperature than the second LED array such that adjustment of the current ratio provides light output of different color temperatures at different times.

13. A light emitting diode (LED) system, the LED system comprising:
  a first LED array having one or more LED devices;
  a second LED array having one or more LED devices,
  a driver module, the driver module comprising a dimmable driver circuit and a current splitter circuit, the dimmable driver circuit configured to provide a driver current, the current splitter circuit configured to split the driver current into a first current for the first LED array and a second current for the second LED array according to a current ratio;
  wherein the driver module has an interface configured to receive a variable reference signal for controlling the current ratio independently of the dimmable driver circuit, the current splitter circuit comprising one or more control devices configured to adjust the current ratio of the first current and the second current independently of the driver current according to a current ratio control curve, the current ratio control curve specifying the current ratio between the first current and the second current as a function of at least the variable reference signal.

14. The LED system of claim 13, wherein the dimmable driver circuit and the current splitter circuit are implemented on the same circuit board.

15. The LED system of claim 13, wherein the current ratio control curve comprises a linear, super-linear, parabolic, logarithmic, asymptotic, or exponential relationship between the current ratio and the variable reference signal.

16. The LED system of claim 13, wherein the current ratio control curve comprises a step function defined at least in part on the variable reference signal.

17. The LED system of claim 13, wherein the current splitter circuit comprises:
  a first switching element;
  a second switching element; and
  wherein the one or more control devices are configured to control the first switching element to provide the first current to the first LED array and to control the second switching element to provide the second current to the second LED array.

18. The LED system of claim 13, wherein the dimmable driver circuit comprises a line dimming driver.

19. The LED system of claim 13, wherein the driver module comprises an interface configured to receive a dimming control signal, the driver current being dependent on the dimming control signal.

20. The LED system of claim 13, wherein the driver module comprises a timing circuit, the timing circuit configured to provide a clock output, the current splitter circuit configured to adjust the current ratio of the first current and the second current based at least in part on the clock output to provide different lighting outputs at different times.

* * * * *